(12) United States Patent
Jung et al.

(10) Patent No.: US 9,909,635 B2
(45) Date of Patent: Mar. 6, 2018

(54) PARKING BRAKE ACTUATOR

(71) Applicant: LG INNOTEK CO., LTD., Seoul (KR)

(72) Inventors: Young Hwan Jung, Seoul (KR); Heok Jin Park, Seoul (KR); Woo Seob Shim, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days.

(21) Appl. No.: 15/217,543

(22) Filed: Jul. 22, 2016

(65) Prior Publication Data
US 2017/0097059 A1   Apr. 6, 2017

(30) Foreign Application Priority Data
Oct. 1, 2015   (KR) .................. 10-2015-0138442

(51) Int. Cl.
*F16D 65/18* (2006.01)
*F16D 121/24* (2012.01)
(Continued)

(52) U.S. Cl.
CPC .......... *F16D 65/18* (2013.01); *F16D 2121/24* (2013.01); *F16D 2125/42* (2013.01);
(Continued)

(58) Field of Classification Search
CPC .. F16D 65/18; F16D 2121/24; F16D 2125/42; H02K 5/225; H02K 2203/06
(Continued)

(56) References Cited

U.S. PATENT DOCUMENTS 3,812,452 A * 5/1974 Sturm .................. H01R 13/112
439/857
6,244,671 B1 * 6/2001 Tamai ..................... B60T 8/368
137/884
(Continued)

FOREIGN PATENT DOCUMENTS

DE   10 2005 042 194 A1   3/2007
EP      0 974 506 A2       1/2000
(Continued)

*Primary Examiner* — Thomas J Williams
*Assistant Examiner* — Mariano Sy
(74) *Attorney, Agent, or Firm* — Birch, Stewart, Kolasch & Birch, LLP

(57) ABSTRACT

An embodiment of the present invention relates to a parking brake actuator which includes a motor; a worm gear connected to the motor to transmit a power; a worm wheel engaged with the worm gear; a drive shaft coupled to the worm wheel, wherein a parking cable is connected to the drive shaft; a power transmission gear including a first gear coupled to a rotational shaft of the motor and a second gear which is coupled to a rotational shaft of the worm gear and connected to the first gear to transmit the power; and a housing including a first accommodation portion disposed at one side of a reference line which is formed perpendicular to the rotational shaft of the motor and passes through the first gear to accommodate the motor, a second accommodation portion disposed at another side of the reference line to accommodate the worm gear so that the rotational shaft of the worm gear is parallel to the rotational shaft of the motor, and a third accommodation portion disposed at the other side of the reference line to accommodate the worm wheel, thus providing an advantageous effect in which motors of various sizes may be applied without machining a separate housing to correspond to each of the sizes of motor or changing sizes or the number of teeth of gears.

14 Claims, 8 Drawing Sheets

(51) Int. Cl.
  *F16D 125/42* (2012.01)
  *F16D 125/48* (2012.01)
  *F16D 125/52* (2012.01)
  *F16D 125/60* (2012.01)

(52) U.S. Cl.
  CPC ...... *F16D 2125/48* (2013.01); *F16D 2125/52* (2013.01); *F16D 2125/60* (2013.01)

(58) Field of Classification Search
  USPC .............................. 188/162; 310/71; 439/857
  See application file for complete search history.

(56) References Cited

U.S. PATENT DOCUMENTS

| | | | | |
|---|---|---|---|---|
| 6,759,783 B2 * | 7/2004 | Hager | .................... | H02K 5/148 310/239 |
| 6,860,570 B2 * | 3/2005 | Yanaka | .................... | B60T 8/32 188/106 P |
| 6,972,501 B2 * | 12/2005 | Morikawa | ............ | B62D 5/0406 310/68 R |
| 7,992,691 B2 * | 8/2011 | Maron | .................. | B60T 13/588 188/156 |
| 8,783,422 B2 * | 7/2014 | Hofschulte | ............. | B60T 7/107 188/72.1 |
| 9,093,877 B2 * | 7/2015 | Klingler | ................. | H02K 5/225 |
| 9,114,798 B1 * | 8/2015 | Fox, IV | ................ | B60W 10/08 |
| 9,528,563 B2 * | 12/2016 | Balz | ....................... | F16D 65/18 |
| 2004/0061391 A1 * | 4/2004 | Matsuyama | ........... | G01P 1/026 310/71 |
| 2009/0295258 A1 * | 12/2009 | Caliendo | ................ | H02K 7/116 310/68 B |

FOREIGN PATENT DOCUMENTS

| | | |
|---|---|---|
| EP | 1 584 533 A1 | 10/2005 |
| JP | 2002-98179 A | 4/2002 |
| JP | 2005-238960 A | 9/2005 |
| JP | 2006-27415 A | 2/2006 |
| KR | 10-2013-0057860 A | 6/2013 |
| KR | 10-2014-0109046 A | 9/2014 |
| WO | WO 2005/014354 A1 | 2/2005 |
| WO | WO 2011/085971 A1 | 7/2011 |

* cited by examiner

PARKING BRAKE ACTUATOR

TECHNICAL FIELD

An embodiment of the present invention relates to a parking brake actuator, and more particularly, to a parking brake actuator including a gear which transmits a driving force of a motor.

BACKGROUND ART

A brake system is an apparatus that reduces speed and simultaneously stops a traveling vehicle and maintains a stopped state of the vehicle. The brake system includes a parking brake that reduces speed, stops a traveling vehicle, and maintains the stopped state of the vehicle.

A parking brake has a parking cable which is pulled by an operation of a lever provided at one side of a driver's seat inside a vehicle and maintains the vehicle in the stopped state by providing a braking force to a wheel linked to the parking cable. Conversely, when the lever is released, the parking cable is released and the braking force provided to the wheel is released.

In such a parking brake, since a driver has to operate the lever by a driver's intent, that is, whenever parking or traveling of the vehicle is initiated, use is very cumbersome. Accordingly, an electric parking brake (EPB) system in which a parking brake is automatically operated by a motor depending on a vehicle's operation state has been developed.

The EPB automatically operates or releases a parking brake and obtains safety in an urgent state in conjunction with a manual operation mode of a driver, a hydraulic electronic control unit (HECU), an engine electronic control unit (ECU), and a traction control unit (TCU) by a switching operation.

In such an EPB system, an ECU, a motor, a gear, a parking cable, a force sensor, and the like are integrally provided. Here, the ECU receives related information from the HECU, the engine ECU, the TCU, and the like through a controller area network (CAN), understands a driver's intent, and operates a parking brake actuator.

When the parking brake actuator is operated, a gear assembly is operated by driving of a motor, the parking cable is pulled by the operation of the gear assembly, a braking force is provided to a wheel, and accordingly the vehicle is maintained in a safe state. Here, the gear assembly may include a worm and a worm wheel which are connected to a rotational shaft of the motor to transmit a force.

Here, a high output is required to increase a braking force. A size of a motor which is applied is increased to increase the output. Conventionally, the worm and the motor are accommodated inside an actuator housing so that rotational shafts of the worm and the motor are parallel to each other. Since a position where the worm is accommodated has to be changed to change the size of the motor, there is a problem in that a separate housing has to be designed and provided for an increase in the size of the motor.

DISCLOSURE

Technical Problem

The present invention is directed to providing a parking actuator capable of overcoming a design limitation due to a position of a worm when a size of a motor is increased in an actuator housing.

The present invention is also directed to providing a parking brake capable of easily connecting a motor to a control board using a simple structure.

The scope of the present invention is not limited to the above-described objects, and other unmentioned objects may be clearly understood by those skilled in the art from the following descriptions.

Technical Solution

One aspect of the present invention provides a parking brake actuator which includes a motor, a worm gear connected to the motor to transmit a power, a worm wheel engaged with the worm gear, a drive shaft coupled to the worm wheel, wherein a parking cable is connected to the drive shaft, a power transmission gear including a first gear coupled to a rotational shaft of the motor and a second gear which is coupled to a rotational shaft of the worm gear and connected to the first gear to transmit the power, and a housing including a first accommodation portion disposed at one side of a reference line which is formed perpendicular to the rotational shaft of the motor and passes through the first gear to accommodate the motor, a second accommodation portion disposed at another side of the reference line to accommodate the worm gear so that the rotational shaft of the worm gear is parallel to the rotational shaft of the motor, and a third accommodation portion disposed at the other side of the reference line to accommodate the worm wheel.

The rotational shaft of the worm gear may be disposed to be spaced apart from the rotational shaft of the motor.

A controller may be accommodated in the third accommodation portion.

The third accommodation portion may be disposed at a side opposite the first accommodation portion on the basis of the reference line.

The first gear and the second gear may be engaged with each other.

The parking brake actuator may further include a connection terminal coupled to the controller and connected to a power source terminal pin of the motor.

The controller may include an extension portion extending up to the first accommodation portion, and the connection terminal may be coupled to the extension portion.

The power source terminal pin may be formed to be bent downward perpendicular to a direction of the rotational shaft of the motor, and the connection terminal may be perpendicularly coupled to the extension portion.

The connection terminal may include a coupling portion formed to protrude in a pin shape from a lower portion thereof and inserted into the controller.

The coupling portion may include a stepped surface hooked to a rear surface of the controller.

The coupling portion may include a slot which is formed by being cut and implements an elastic transform space.

Advantageous Effects

According to the embodiment of the present invention, by accommodating a worm gear at a side opposite a motor and providing a space beside the motor to be used as an extension space in a housing, an advantageous effect of being able to apply motors of various sizes without machining a separate housing to correspond to each of the sizes of motor or changing a size or the number of teeth of gears is provided.

In addition, according to the embodiment of the present invention, when connecting a power source terminal pin of a motor to a control board, by providing a connection terminal capable of being assembled with a controller and removing a pressing pin injection molded at the controller, an advantageous effect of obtaining an easy assembly and decreasing cost is provided.

REFERENCE NUMERALS

100: MOTOR
110: STATOR
120: ROTOR
130: ROTATIONAL SHAFT
140: HOUSING
150: BEARING
200: WORM GEAR
300: WORM WHEEL
400: DRIVE SHAFT
500: POWER TRANSMISSION GEAR
510: FIRST GEAR
520: SECOND GEAR
600: HOUSING
610: FIRST ACCOMMODATION PORTION
620: SECOND ACCOMMODATION PORTION
630: THIRD ACCOMMODATION PORTION
700: CONNECTION TERMINAL
800: CONTROLLER

MODES OF THE INVENTION

Purposes, specific advantages, and novel features of the invention will be made clear from exemplary embodiments and the following detailed description in connection with the accompanying drawings. Terms and words used in this specification and claims are not to be interpreted as limited to commonly used meanings or meanings in dictionaries and should be interpreted with meanings and concepts which are consistent with the technological scope of the invention based on the principle that the inventors have appropriately defined concepts of terms in order to describe the invention in the best way. In the description of the invention, when it is determined that detailed descriptions of related well-known functions unnecessarily obscure the gist of the invention, detailed descriptions thereof will be omitted.

It should be understood that, although the terms "first," "second," etc. may be used herein to describe various elements, these elements are not limited by these terms. These terms are only used to distinguish one element from another. For example, a second element could be termed a first element, and, similarly, a first element could be termed a second element, without departing from the scope of the present invention. As used herein, the term "and/or" includes any and all combinations of one or more of the associated listed items.

Figure 1:
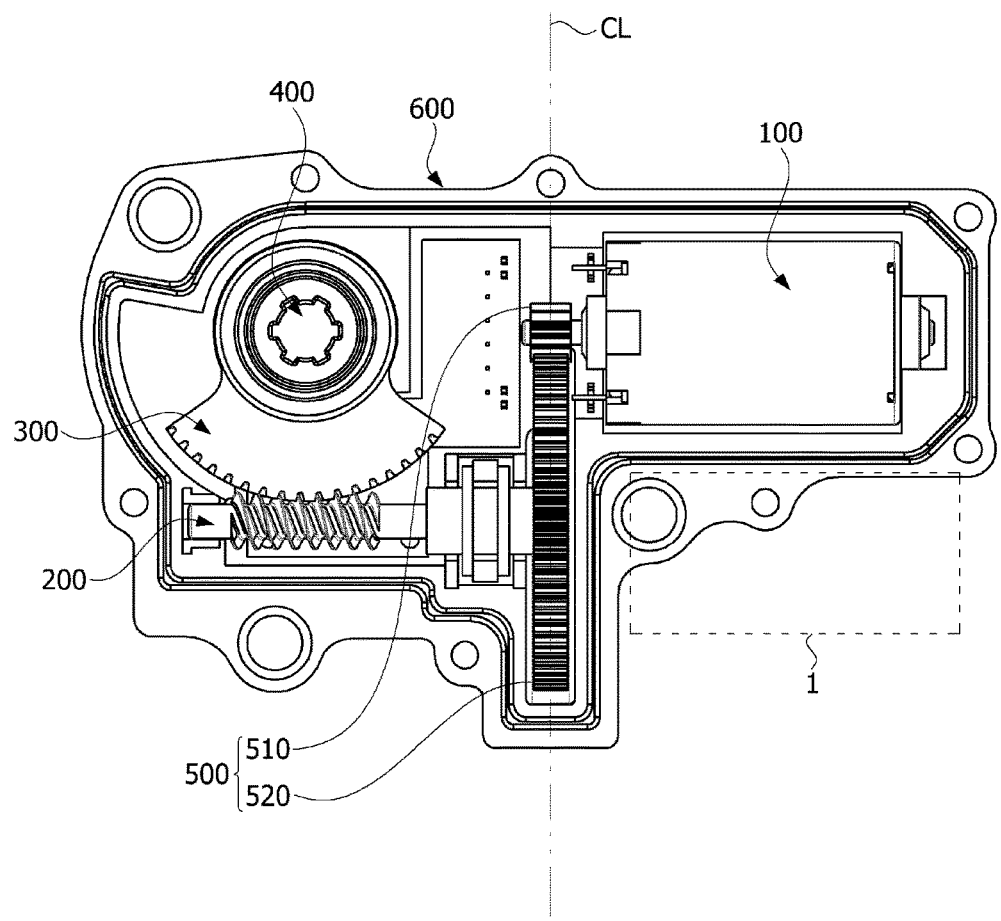
FIG. 1 is a view illustrating a parking brake actuator according to an exemplary embodiment of the present invention.

FIG. 1 is a view illustrating a parking brake actuator according to an exemplary embodiment of the present invention. FIG. 1 is a view clearly illustrating only main features to clearly conceptually understand the present invention, and as a result, various modifications are expected and the scope of the present invention is not limited to specific shapes illustrated in the drawing.

Referring to FIG. 1, the parking brake actuator according to the exemplary embodiment of the present invention may include a motor 100, a worm gear 200, a worm wheel 300, a drive shaft 400, a power transmission gear 500, and a housing 600.

The worm gear 200, the worm wheel 300, and the power transmission gear 500 serve to transmit a rotational force of the motor 100 to the drive shaft 400. A parking cable may be connected to the drive shaft 400.

Figure 2:
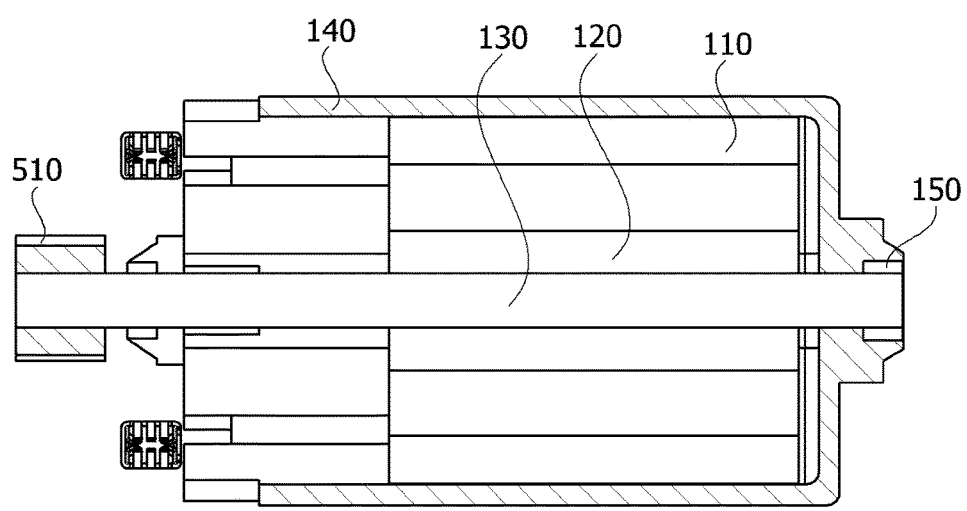
FIG. 2 is a view illustrating a motor illustrated in FIG. 1.

FIG. 2 is a view illustrating a motor illustrated in FIG. 1.

Referring to FIG. 2, the motor 100 may include a stator 110, a rotor 120, and a rotational shaft 130.

The stator 110 may be fixed inside a housing 140. The rotor 120 may be disposed inside the stator 110, and the rotational shaft 130 may be coupled to a central portion of the rotor 120. A coil which forms a magnetic field may be wound around the stator 110, and a magnet may be included in the rotor 120. The rotor 120 is rotated due to an interaction of the coil and the magnet, and when the rotor rotates, the rotational shaft 130 is rotated and a driving force which pulls or pushes the parking cable is generated.

The rotational shaft 130 may be rotatably supported by a bearing 150.

The stator 110 is provided with one core or by coupling a plurality of separated cores.

Figure 3:
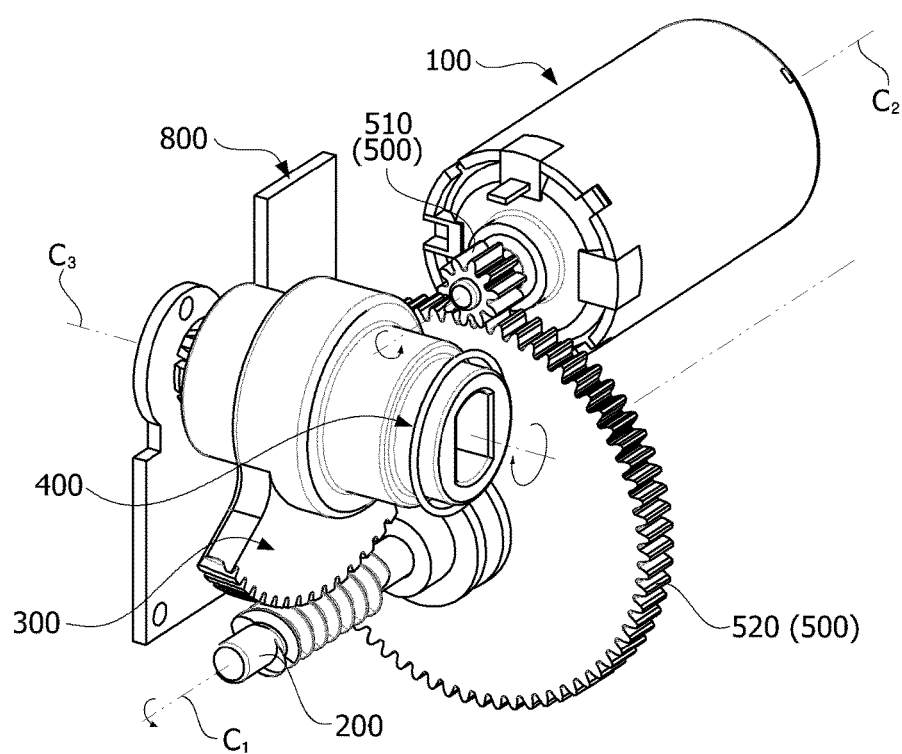
FIG. 3 is a view illustrated a worm gear, a worm wheel, and a power transmission gear.

FIG. 3 is a view illustrating a worm gear, a worm wheel, and a power transmission gear.

Referring to FIGS. 1 and 3, the worm gear 200 may be disposed so that a rotational shaft C1 of the worm gear 200 is parallel to a rotational shaft C2 of the motor 100. The worm wheel 300 is engaged with the worm gear 200, and the drive shaft 400 is coupled to a central shaft of the worm wheel 300. A rotational shaft C3 of the worm wheel 300 is perpendicular to the rotational shaft C1 of the worm gear 200.

The motor 100 and the worm gear 200 are connected through the power transmission gear 500.

The power transmission gear 500 may include a first gear 510 and a second gear 520.

The first gear 510 may be connected to the rotational shaft of the motor 100. In addition, the second gear 520 may be coupled to the rotational shaft of the worm wheel 300. The first gear 510 and the second gear 520 are disposed to be engaged with each other. Since the number of teeth of the second gear 520 is greater than that of the first gear 510, a rotational speed of the motor 100 is reduced and transmitted to the worm wheel 300.

When the motor 100 rotates, the first gear 510 is rotated. When the first gear 510 is rotated, the second gear 520 and the worm gear 200 are rotated. When the worm wheel 300 is rotated about the rotational shaft C3 as the worm gear 200 is rotated, the drive shaft 400 is rotated and pulls the parking cable, and thus a braking force is provided to the parking brake.

At this point, a high output of the motor 100 is required to increase the braking force of the parking brake. A motor having a high output has a relatively large size. Accordingly, a bigger accommodation space accommodating the motor 100 is required in the housing 600. However, when the worm gear 200 is accommodated next to the motor 100 in parallel similar to an area shown as 1 in FIG. 1, there is a spatial limitation in accommodating the motor 100 having a larger size.

That is, in a state in which a ratio and sizes of the first gear 510 and the second gear 520 are decided, when a size of the motor 100 is changed, there is an inconvenience in that the ratio and the sizes of the first gear 510 and the second gear 520 have to be changed. Alternatively, an inside surface of the housing 600 has to be cut to obtain a size corresponding to an expanded space, and accordingly there are problems in that a process is complicated and a strength of the housing 600 is lowered.

The housing 600 of the parking brake actuator according to the exemplary embodiment of the present invention is provided to solve such problems, and there is characterized in that a design tolerance is obtained by obtaining a space just beside the motor 100 when a size of the motor 100 is increased.

Figure 4:
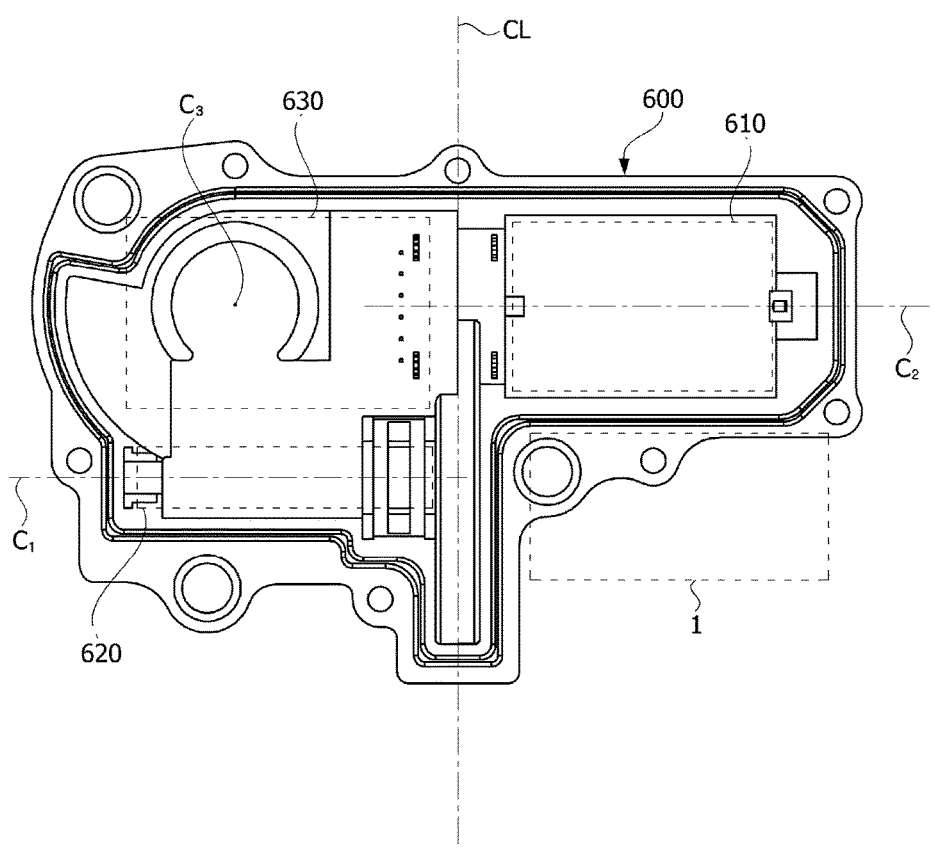
FIG. 4 is a view illustrating a housing illustrated in FIG. 1.

FIG. 4 is a view illustrating a housing illustrated in FIG. 1.

Referring to FIG. 4, the housing 600 may include a first accommodation portion 610, a second accommodation portion 620, and a third accommodation portion 630.

Referring to FIGS. 1 and 4, the first accommodation portion 610 may be disposed at one side of a reference line CL perpendicular to the rotational shaft C2 of the motor 100, and the second accommodation portion 620 and the third accommodation portion 630 are disposed at the other side of the reference line CL.

The motor 100 is seated in the first accommodation portion 610. The worm gear 200 is seated in the second accommodation portion 620. The rotational shaft of the motor 100 and the rotational shaft of the worm gear 200 are disposed in parallel to each other.

The second accommodation portion 620 is positioned at a side opposite the first accommodation portion 610 on the basis of the reference line CL. Accordingly, an expansion space similar to a space 1 shown in FIG. 4 and positioned beside the first accommodation portion 610 accommodating the motor 100 may be obtained. Accordingly, a size of the first accommodation portion 610 may be variously changed to correspond to a size of the motor.

When an expansion space similar to the space 1 shown in FIG. 4 is obtained, a space does not need to be obtained by cutting the inside surface of the housing 600 to accommodate the motor having a big size. In addition, the ratio or the sizes of the first gear 510 and the second gear 520 do not need to be changed.

The third accommodation portion 630 is also positioned at the side opposite the first accommodation portion 610 on the basis of the reference line CL. For example, the third accommodation portion 630 may be positioned at a side facing the first accommodation portion 610 on the basis of the reference line CL. Such a third accommodation portion 630 accommodates the worm wheel 300 and the drive shaft 400. In addition, a controller 800 may be installed in the third accommodation portion 630. The controller 800 may be a board on which control elements that control driving of the motor 100, sensor elements that detect a position of the worm wheel 300, or the like are mounted.

The worm gear 200 is installed in the second accommodation portion 620 to be rotatable about the reference line CL. In addition, the worm wheel 300 is installed in the third accommodation portion 630 to be rotatable about the rotational shaft C3. The first gear 510 and the second gear 520 are disposed to be engaged with each other on the reference line CL.

Figure 5:
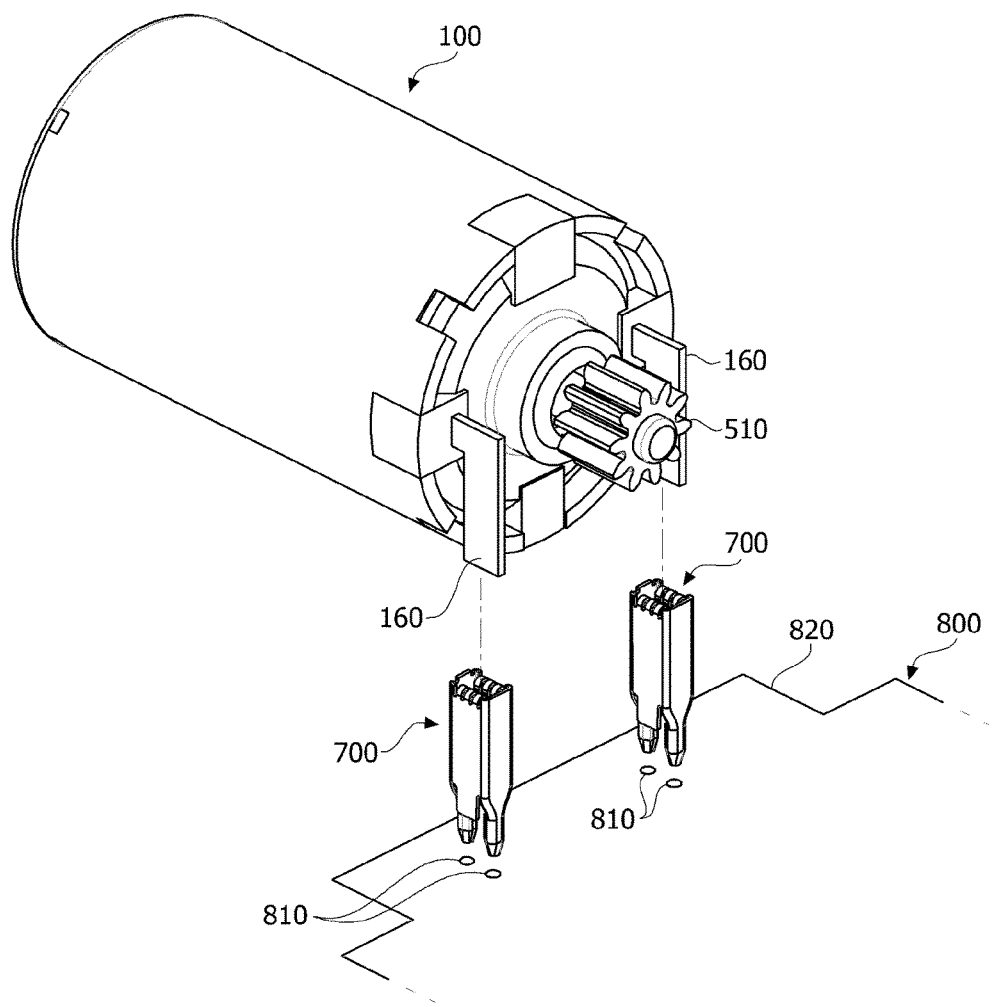
FIG. 5 is a view illustrating power source terminal pins of the motor and connection terminals.
Figure 6:
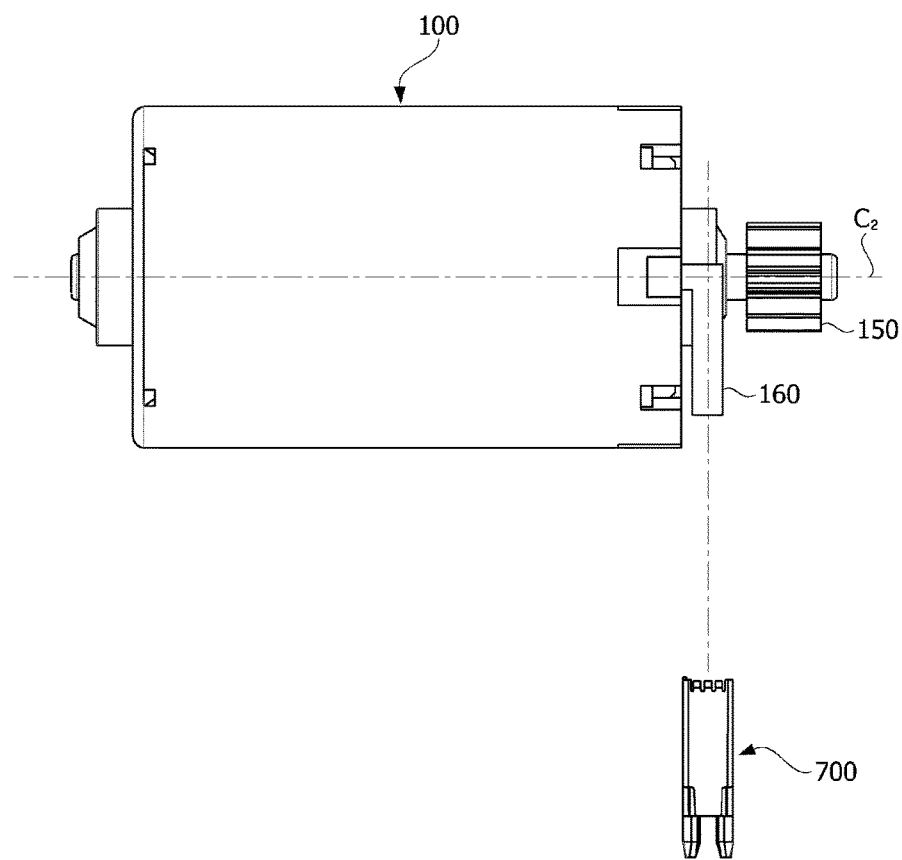
FIG. 6 is a view illustrating the power source terminal pin bent perpendicular to a rotational shaft of the motor and the connection terminal.
Figure 7:
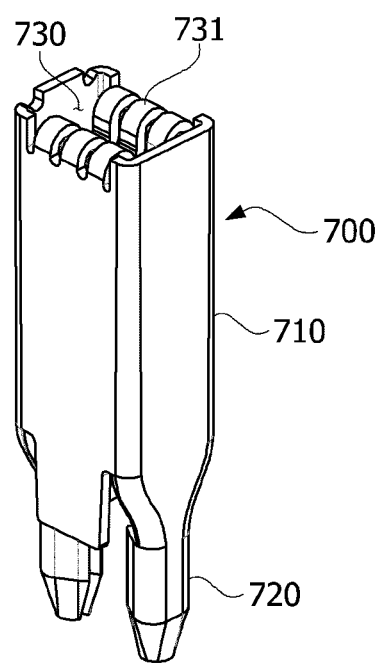
FIG. 7 is a view illustrating the connection terminal.
Figure 8:
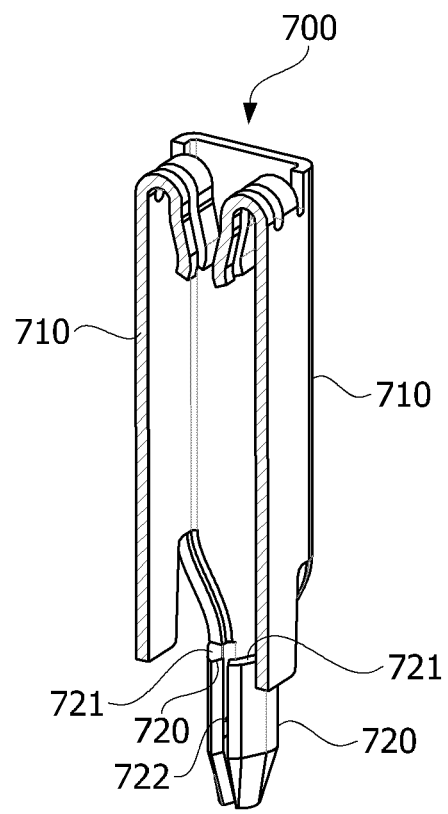
FIG. 8 is a side cross-sectional view illustrating the connection terminal.

FIG. 5 is a view illustrating power source terminal pins of the motor and connection terminals, FIG. 6 is a view illustrating the power source terminal pin bent perpendicular to a rotational shaft of the motor and the connection terminal, FIG. 7 is a view illustrating the connection terminal, and FIG. 8 is a side cross-sectional view illustrating the connection terminal.

Referring to FIG. 5, the motor 100 may be connected to the controller 800 through connection terminals 700. Although power source terminal pins 160 of the motor 100 may be connected to a separate pressing pin protruding from the controller 800, such a structure has problems in that a cost is increased since the pressing pin is injection molded on the controller 800, and it is difficult to manage a size and shape of the pressing pin and to assemble the pressing pin.

The parking brake actuator according to the exemplary embodiment of the present invention is characterized in that the power source terminal pins 160 of the motor 100 and the controller 800 are connected to each other through the connection terminals 700 to solve the above-described problems.

An extension portion 820 formed to extend toward the first accommodation portion 610 in FIG. 4 accommodating the motor 100 is provided at the controller 800. In addition, coupling holes 810 into which the connection terminals 700 are respectively inserted may be formed in the extension portion 820.

Referring to FIGS. 6 to 8, the power source terminal pin 160 may be formed to be bent downward in a direction perpendicular to the rotational shaft C2. A lower end of the power source terminal pin 160 is inserted into and electrically connected to an upper end of the connection terminal 700.

The connection terminal 700 may include a body 710, a coupling portion 720, and an insertion portion 730. The body 710 may be formed to an appropriate length that compensates for a separation distance between the power source terminal pin 160 and the controller 800. In addition, an electrode which electrically connects the power source terminal pin 160 and the controller 800 is included inside the body 710.

The coupling portion 720 may be formed to protrude from a lower end of the body 710. As illustrated in FIG. 8, the coupling portion 720 may be formed as a pair of pin shapes. An end of the coupling portion 720 may be formed to sharply taper to be easily inserted into the coupling hole 810 in FIG. 5 of the controller 800. In addition, a rear end of the coupling portion 720 may be formed to have a stepped surface 721 in FIG. 8 so that the coupling portion 720 which penetrates the controller 800 may be hooked to a rear surface of the controller 800.

In addition, the coupling portion 720 may include a slot 722 forming a separation space. The slot 722 induces an elastic transformation of the coupling portion 720 while the connection terminal 700 is mounted on the controller 800 and guides the end of the coupling portion 720 to be easily inserted into the controller 800.

The insertion portion 730 is a portion which is formed at an upper portion of the body 710 and into which the power source terminal pin 160 is inserted. A plurality of insertion guiding pieces 731 formed to be bent downward for guiding a smooth insertion of the power source terminal pin 160 may be provided in the insertion portion 730. The insertion guiding pieces 731 are formed in a cantilever beam-like shape bent at an upper end of the body 710, and provided to be elastically transformable.

When the motor 100 is connected to the controller 800, since an operation proceeds in a form in which the connection terminal 700 is assembled to the controller 800 and the power source terminal pin 160 is inserted into the connection terminal 700, a process through which a separate pressing pin for coupling is injection molded on the controller 800 may be omitted, the process may be simplified, and cost may be decreased. In addition, the management of the sizes of the pressing pin is not needed.

The parking brake actuator according to the exemplary embodiment of the present invention has been specifically described with reference to the accompanying drawings.

The above-described one embodiment should be considered in a descriptive sense only and not for purposes of limitation. The scope of the present invention is defined not by the detailed description but by the appended claims, and encompasses all modifications and alterations derived from meanings, the scope, and the equivalents of the appended claims.

The invention claimed is:

1. A parking brake actuator comprising:
   a motor;
   a worm gear connected to the motor to transmit a power;
   a worm wheel engaged with the worm gear;
   a drive shaft coupled to the worm wheel, wherein a parking cable is connected to the drive shaft;
   a power transmission gear including a first gear coupled to a rotational shaft of the motor and a second gear which is coupled to a rotational shaft of the worm gear and connected to the first gear to transmit the power;
   a housing including a first accommodation portion disposed at one side of a reference line which is formed perpendicular to the rotational shaft of the motor and passes through the first gear to accommodate the motor, a second accommodation portion disposed at the other side of the reference line to accommodate the worm gear so that the rotational shaft of the worm gear is parallel to the rotational shaft of the motor, and a third accommodation portion disposed at the other side of the reference line to accommodate the worm wheel;
   a controller accommodated in the third accommodation portion; and
   a connection terminal coupled to the controller and connected to a power source terminal pin of the motor,
   wherein the controller includes an extension portion extending toward the first accommodation portion, and the connection terminal is coupled to the extension portion.

2. The parking brake actuator of claim 1, wherein the rotational shaft of the worm gear is disposed to be spaced apart from and parallel to the rotational shaft of the motor.

3. The parking brake actuator of claim 2, wherein the drive shaft is accommodated in the third accommodation portion.

4. The parking brake actuator of claim 3, wherein the third accommodation portion is disposed at a side opposite the first accommodation portion on the basis of the reference line.

5. The parking brake actuator of claim 4, wherein the first gear and the second gear are disposed to be engaged with each other on the reference line.

6. The parking brake actuator of claim 1, wherein the connection terminal includes a body, a coupling portion, and an insertion portion,
   wherein the body includes an electrode which electrically connects the power source terminal pin and the controller, and
   wherein the coupling portion protrudes from a lower end of the body as a pair of pin shapes.

7. The parking brake actuator of claim 6, further comprising coupling holes in the extension portion into which the connection terminals are respectively inserted.

8. The parking brake actuator of claim 7, wherein the power source terminal pin is formed to be bent downward perpendicular to a direction of the rotational shaft of the motor, and the connection terminal is perpendicularly coupled to the extension portion, and
   wherein the insertion portion includes a plurality of insertion guiding pieces formed in a cantilever shape bent at an upper end of the body and are elastically transformable.

9. The parking brake actuator of claim 8, wherein an end of the coupling portion is formed to sharply taper to be inserted into the coupling hole of the controller.

10. The parking brake actuator of claim 9, wherein the coupling portion includes a stepped surface hooked to a rear surface of the controller.

11. The parking brake actuator of claim 10, wherein the coupling portion includes a slot which is formed by being cut and implements an elastic transform space.

12. The parking brake actuator of claim 8, wherein the parking cable is directly connected to the drive shaft.

13. The parking brake actuator of claim 8, wherein the worm wheel has a central shaft, and
   wherein the drive shaft is coupled within the central shaft.

14. The parking brake actuator of claim 1, wherein the motor has a housing, and
   wherein the motor housing is within the first accommodation portion.

* * * * *